United States Patent
Izadian et al.

(10) Patent No.: US 10,992,053 B2
(45) Date of Patent: *Apr. 27, 2021

(54) RADAR ANTENNA ARRAY WITH PARASITIC ELEMENTS EXCITED BY SURFACE WAVES

(71) Applicant: Waymo LLC, Mountain View, CA (US)

(72) Inventors: Jamal Izadian, Mountain View, CA (US); Russell Smith, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/658,287

(22) Filed: Oct. 21, 2019

(65) Prior Publication Data
US 2020/0052413 A1 Feb. 13, 2020

Related U.S. Application Data

(63) Continuation of application No. 15/206,839, filed on Jul. 11, 2016, now Pat. No. 10,490,905.

(51) Int. Cl.
*H01Q 21/00* (2006.01)
*H01P 5/12* (2006.01)
(Continued)

(52) U.S. Cl.
CPC .......... *H01Q 21/005* (2013.01); *H01P 5/12* (2013.01); *H01P 5/182* (2013.01); *H01P 11/002* (2013.01);
(Continued)

(58) Field of Classification Search
CPC .... H01Q 21/005; H01Q 21/064; H01Q 13/02; H01Q 13/10; H01Q 19/08; H01Q 1/246;
(Continued)

(56) References Cited

U.S. PATENT DOCUMENTS

| | | | | |
|---|---|---|---|---|
| 5,543,805 | A * | 8/1996 | Thaniyavarn | H01Q 3/2676 342/368 |
| 7,202,832 | B2 * | 4/2007 | Wang | H01Q 1/3275 343/711 |

(Continued)

FOREIGN PATENT DOCUMENTS

| JP | 201366003 A | 4/2013 |
|---|---|---|
| JP | 2014168222 A | 9/2014 |

OTHER PUBLICATIONS

English machine translation of Japanese Office Action for Japanese application No. JP2019-500829, dated Nov. 25, 2019.
(Continued)

*Primary Examiner* — Olumide Ajibade Akonai
(74) *Attorney, Agent, or Firm* — McDonnell Boehnen Hulbert & Berghoff LLP

(57) ABSTRACT

An apparatus includes a waveguide of an antenna block configured to propagate electromagnetic energy along a propagation direction. The antenna block includes a port located on a bottom surface of the antenna block and an antenna array located on a top surface of the antenna block. The antenna block further includes a set of waveguides in the antenna block configured to couple the antenna array to the port. Additionally, the antenna block includes at least one surface wave radiator, where the surface wave radiator is located on the top surface of the antenna block.

20 Claims, 14 Drawing Sheets

(51) Int. Cl.
  H01P 5/18      (2006.01)
  H01P 11/00     (2006.01)
  H01Q 21/06     (2006.01)
  H01Q 3/24      (2006.01)
  H01Q 9/04      (2006.01)
  H01Q 1/38      (2006.01)
  H01Q 1/52      (2006.01)
  G01S 13/931    (2020.01)
  G01S 13/02     (2006.01)

(52) U.S. Cl.
  CPC ............ *H01Q 3/24* (2013.01); *H01Q 9/0407* (2013.01); *H01Q 21/0087* (2013.01); *H01Q 21/064* (2013.01); *G01S 13/931* (2013.01); *G01S 2013/0254* (2013.01); *H01Q 1/38* (2013.01); *H01Q 1/52* (2013.01)

(58) Field of Classification Search
  CPC .......... H01Q 1/38; H01Q 21/065; H01Q 5/10; H01Q 5/321; H01Q 21/0006; H01P 3/003; H01P 5/022; H05K 1/0219; H05K 1/024; H05K 2201/0187; H05K 2201/0191; H05K 2201/09036
  See application file for complete search history.

(56) References Cited

U.S. PATENT DOCUMENTS

| | | | |
|---|---|---|---|
| 8,040,286 B2 | 10/2011 | Matsuo | |
| 8,558,746 B2* | 10/2013 | Thomson | ........... H01Q 21/0075 343/776 |
| 10,050,348 B2 | 8/2018 | Kawaguchi | |
| 2002/0101385 A1 | 8/2002 | Huor | |
| 2002/0163478 A1* | 11/2002 | Pleva | ................. H01Q 21/0075 343/853 |
| 2003/0011517 A1 | 1/2003 | Kolak | |
| 2004/0113840 A1 | 6/2004 | Gottwald | |
| 2005/0128028 A1* | 6/2005 | Sanchez | ................... H01Q 3/04 333/157 |
| 2005/0028059 A1 | 12/2005 | Yegin | |
| 2005/0280592 A1 | 12/2005 | Yegin | |
| 2006/0044200 A1 | 3/2006 | Mori | |
| 2009/0015497 A1 | 1/2009 | Nagumo | |
| 2009/0174604 A1 | 7/2009 | Keskitalo | |
| 2012/0256800 A1 | 10/2012 | Kuonanoja | |
| 2013/0021112 A1 | 1/2013 | Apostolos | |
| 2013/0241779 A1 | 9/2013 | Korva | |
| 2016/0036111 A1 | 2/2016 | Gregoire | |
| 2016/0079672 A1 | 3/2016 | Cerreno | |
| 2017/0047665 A1 | 2/2017 | Yang | |

OTHER PUBLICATIONS

Maruyama et al., "Fabrication of four element array using wideband and dual polarized open-ended waveguide for planar antennas", IEICE Communications Express, vol. 5, Issue 8, pp. 242-247 (2016).

International Search Report for corresponding PCT application PCT/US2017/040295, dated May 4, 2018.

* cited by examiner

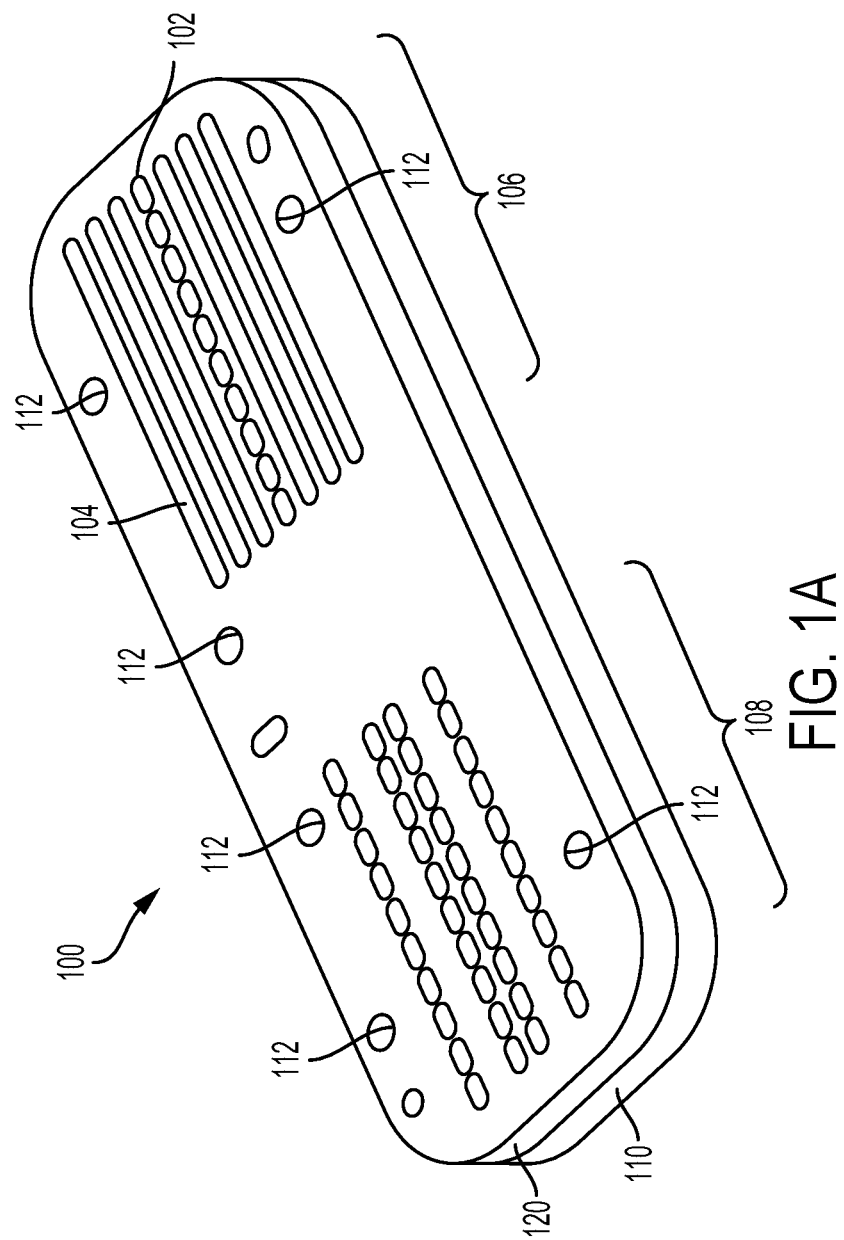

RADAR ANTENNA ARRAY WITH PARASITIC ELEMENTS EXCITED BY SURFACE WAVES

CROSS REFERENCE TO RELATED APPLICATION

The present application claims priority to U.S. patent application Ser. No. 15/206,839, filed on Jul. 11, 2016, the entire contents of which is herein incorporated by reference.

BACKGROUND

Unless otherwise indicated herein, the materials described in this section are not prior art to the claims in this application and are not admitted to be prior art by inclusion in this section.

Radio detection and ranging (RADAR) systems can be used to actively estimate distances to environmental features by emitting radio signals and detecting returning reflected signals. Distances to radio-reflective features can be determined according to the time delay between transmission and reception. The radar system can emit a signal that varies in frequency over time, such as a signal with a time-varying frequency ramp, and then relate the difference in frequency between the emitted signal and the reflected signal to a range estimate. Some systems may also estimate relative motion of reflective objects based on Doppler frequency shifts in the received reflected signals.

Directional antennas can be used for the transmission and/or reception of signals to associate each range estimate with a bearing. More generally, directional antennas can also be used to focus radiated energy on a given field of view of interest. Combining the measured distances and the directional information allows for the surrounding environment features to be mapped. The radar sensor can thus be used, for instance, by an autonomous vehicle control system to avoid obstacles indicated by the sensor information.

Some example automotive radar systems may be configured to operate at an electromagnetic wave frequency of 77 Giga-Hertz (GHz), which corresponds to a millimeter (mm) wave electromagnetic wave length (e.g., 3.9 mm for 77 GHz). These radar systems may use antennas that can focus the radiated energy into tight beams in order to enable the radar system to measure an environment with high accuracy, such as an environment around an autonomous vehicle. Such antennas may be compact (typically with rectangular form factors), efficient (i.e., with little of the 77 GHz energy lost to heat in the antenna or reflected back into the transmitter electronics), and low cost and easy to manufacture (i.e., radar systems with these antennas can be made in high volume).

SUMMARY

Disclosed herein are embodiments that relate to methods and apparatuses for an antenna block. The antenna block includes a port located on a bottom surface of the antenna block and an antenna array located on a top surface of the antenna block. The antenna block further includes a set of waveguides in the antenna block configured to couple the antenna array to the port. Additionally, the antenna block includes at least one surface wave radiator, where the surface wave radiator is located on the top surface of the antenna block.

In another aspect, the present application describes a method. The method includes coupling electromagnetic energy into an antenna block via a port located on a bottom surface of the antenna block. The method also includes propagating, by a set of waveguides in the antenna block, a first portion of the coupled electromagnetic energy from the port to an antenna array located on a top surface of the antenna block, where a second portion of the coupled electromagnetic energy is present in a surface wave in the antenna block. Additionally, the method includes radiating, by the antenna array, at least a portion of the waveguide-propagated electromagnetic energy and radiating, by at least one surface wave radiator located on the top surface of the antenna block, at least a portion of the electromagnetic energy present in the surface wave.

In yet another example, a system is provided. The system includes a bottom block comprising a port. The system also includes a top block having an antenna array. The system further includes a seam at a coupling location of the top block and the bottom block, where the seam defines a center of a waveguide network configured to couple the port to the antenna array. Yet further, the system includes at least one surface wave radiator in the top block.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 1A illustrates an assembled view of the top of an example antenna, in accordance with an example embodiment

DETAILED DESCRIPTION

Figure 1B:
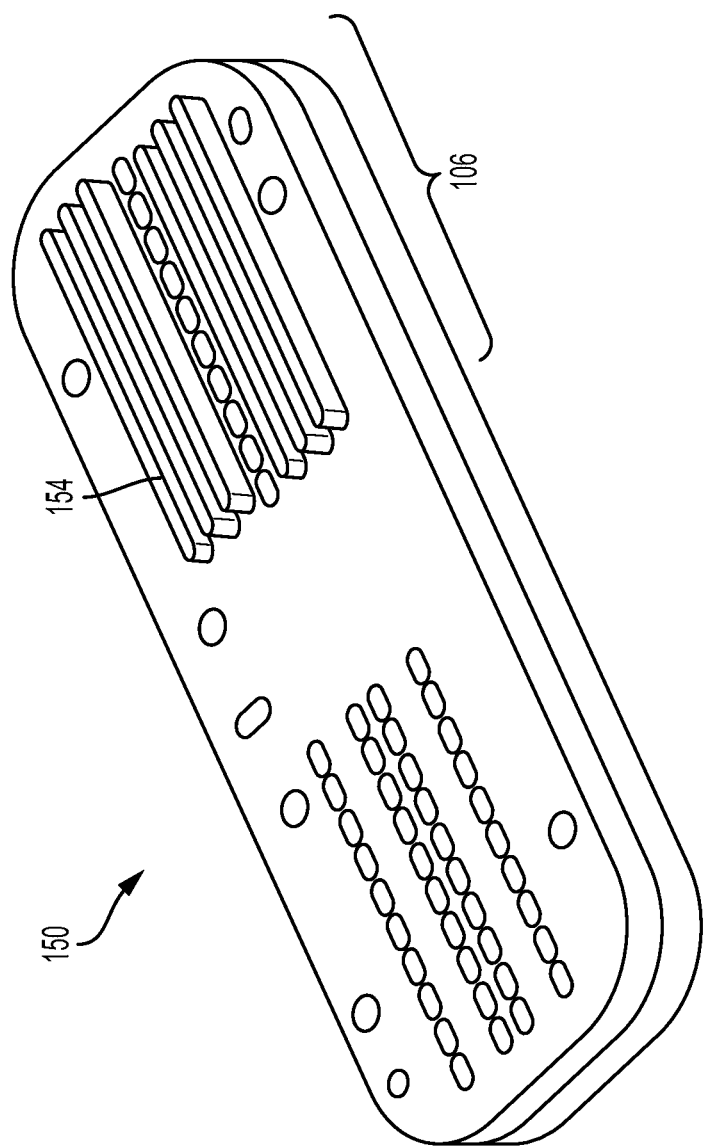
FIG. 1B illustrates an assembled view of the top of an example antenna, in accordance with an example embodiment

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The following detailed description relates to an apparatus and methods for an automotive radar antenna array with parasitic elements (i.e. surface wave radiators) excited by surface waves. A radar antenna array of an autonomous vehicle may include a plurality of antennas. Each antenna may be configured to (i) transmit electromagnetic signals, (ii) receive electromagnetic signals, or (iii) both transmit and receive electromagnetic signals. The antennas may form an array of antenna elements. Each antenna of the array may be fed (i.e., supplied with a signal) from a waveguide. Additionally, the waveguide may communicate signals received by the various antennas to a receiver within the radar system. One aspect of the present disclosure provides for parasitic elements located adjacent to the array. The parasitic elements may be configured to radiate electromagnetic energy present as surface waves on a top surface of the antenna. The disclosed apparatus and methods may be used to reduce or mitigate undesired effects caused by surface waves caused by the array-radiated electromagnetic waves. As used herein, the terms electromagnetic energy, electromagnetic signals, signals, electromagnetic waves, and waves may be used interchangeably to denote the electromagnetic energy that is used with the systems and methods.

The following detailed description may be used with an apparatus having an antenna array that may take the form of a single-input single-output single-input, multiple-output (SIMO), multiple-input single-output (MISO), multiple-input multiple-output (MIMO), and/or synthetic aperture radar (SAR) radar antenna architecture. The radar antenna architecture may include a plurality of "dual open-ended waveguide" (DOEWG) antennas. In some examples, the term "DOEWG" may refer herein to a short section of a horizontal waveguide channel plus a vertical channel that splits into two parts, where each of the two parts of the vertical channel includes an output port configured to radiate at least a portion of electromagnetic waves that enter the antenna. Additionally, a plurality of DOEWG antennas may be arranged into an antenna array. The radar antenna architecture described herein may include a plurality of antenna arrays.

An example antenna architecture may comprise, for example, two metal layers (e.g., aluminum plates) that can be machined with computer numerical control (CNC), aligned properly, and joined together. The first metal layer may include a first half of an input waveguide channel, where the first half of the first waveguide channel includes an input port that may be configured to receive electromagnetic waves (e.g., 77 GHz millimeter waves) into the first waveguide channel. The first metal layer may also include a first half of a plurality of wave-dividing channels. The plurality of wave-dividing channels may comprise a network of channels that branch out from the input waveguide channel and that may be configured to receive the electromagnetic waves from the input waveguide channel, divide the electromagnetic waves into a plurality of portions of electromagnetic waves (i.e., power dividers), and propagate respective portions of electromagnetic waves to respective wave-radiating channels of a plurality of wave-radiating channels. The two metal layers may be assembled together to form a split-block assembly.

Conventional radar antenna may include complex beam forming networks. The presently-disclosed parasitic elements may remove the need for the use of complex beamforming. The parasitic elements may be designed in a way to achieve similar radar performance in a less complicated design. However, in some examples, the presently-disclosed parasitic elements may be used with conventional radar systems that use complicated beamforming networks. Although this disclosure will discuss beamforming (and beam splitting), the parasitic elements may be used in embodiments that have or do not have a complicated beamforming network. In various examples, the power dividing elements of the antenna architecture may be a two- or three-dimensional dividing network of waveguides. The dividing network of waveguides may use waveguide geometry to divide power. For example, the feed waveguides may have a predetermined height and width. The predetermined height and width may be based on a frequency of operation of the radar unit. The dividing network may include waveguides that differ in height and/or width from the predetermined height and width of the feed waveguides in order to achieve a desired taper profile.

Additionally, traditional beamforming networks may also include feed waveguides that provide a signal to radiating elements (i.e. antenna elements) may be divided between the top and bottom portions of the split-block assembly. Further, the feed waveguides may all be located in a common plane where the midpoint of the height of feed waveguides is common for all of the feed waveguides. The dividing network of waveguides may be located partly in the same plane as the feed waveguides and partly in at least one other plane. For example, the entire height of a portion of the dividing network of waveguides may be machined into either the first or second portion of the split-block assembly. When the two block pieces are brought together, a surface of the other block portion may form an edge of the portion or the dividing network of waveguides that has its height fully in one of the two block sections. In some examples, the vertical portion of these waveguide cavities and cuts are symmetric with respect to the split block seam.

When operating a waveguide system, various signals may be propagated through the waveguide system. The waveguide system may include a network of waveguides each with at least one antenna element on the top surface of the antenna block. Conventionally, each antenna element would radiate a portion of the electromagnetic energy fed to it. Another portion of the electromagnetic energy would propagate as a surface wave. The energy that propagates as a surface wave may cause undesirable effects. For example, surface waves may reduce system efficiency and/or cause an undesired radiation pattern. The disclosed system and methods may make testing and operation of antenna systems more efficient.

An antenna block disclosed herein may include various parasitic elements on the top surface of the antenna block. The parasitic elements may be located adjacent to an antenna array on the top surface of the block. These parasitic elements may cause the radiation of some of the energy that is propagated as surface waves. By radiating some of the surface wave energy, the efficiency of the antenna block may be increased. Additionally, the radiating of some of the surface wave energy may cause the antenna block to have a more desirable performance. By designing these elements in a correct manner, the radiation pattern of the radiated electromagnetic energy may be controlled based on a predetermined radiation pattern. Additionally, in some examples, the parasitic elements may also be used to steer the beam radiated by the antenna block. In some examples, the parasitic elements of the waveguide flange may be radiating slots. Various other radiating elements may be used as well.

A waveguide is a structure that conducts electromagnetic energy from one location to another location. In some instances, conducting electromagnetic energy with a waveguide has the advantage of having less loss than other conduction means. A waveguide will typically have less loss than other conduction means because the electromagnetic energy is conducted through a very low loss medium. For example, the electromagnetic energy of a waveguide may be conducted through air or a low loss dielectric.

In one embodiment, such as an air-filled waveguide, the waveguide will have a metallic outer conductor. However, in other embodiments, the waveguide may be formed by only the dielectric medium through which the energy propagates. In either embodiment, the size and shape of the waveguide define the propagation of the electromagnetic energy. For example, electromagnetic energy may bounce (or reflect) off the metallic walls of waveguide. In other embodiments, a dielectric medium may fully contain the electromagnetic energy (such as fiber optic transmission).

Based on the shape and the materials of the waveguide, the propagation of the electromagnetic energy will vary. The shape and the materials of the waveguide define the boundary conditions for the electromagnetic energy. Boundary conditions are known conditions for the electromagnetic energy at the edges of the waveguide. For example, in the metallic waveguide, assuming the waveguide walls are nearly perfectly conducting, the boundary conditions specify that there is no tangentially directed electric field at any of the wall sides. Once the boundary conditions are known, Maxwell's Equations can be used to determine how electromagnetic energy propagates through the waveguide.

Maxwell's Equations will define several modes of operation for any given waveguide. Each mode defines one specific way in which electromagnetic energy can propagate through the waveguide. Each mode has an associated cutoff frequency. A mode is not supported in a waveguide if the electromagnetic energy has a frequency that is below the cutoff frequency. By properly selecting both (i) waveguide dimensions and (ii) frequency of operation, electromagnetic energy may propagate through the waveguide in a specific mode. Often, waveguides are designed so only one propagation mode is supported at the design frequency.

There are four main types of waveguide propagation modes: Transverse Electric (TE) modes, Transverse Magnetic (TM) modes, Transverse Electromagnetic (TEM) modes, and Hybrid modes. In TE modes, the electromagnetic energy has no electric field in the direction of the electromagnetic energy propagation. In TM modes, the electromagnetic energy has no magnetic field in the direction of the electromagnetic energy propagation. In TEM modes, the electromagnetic energy has no electric or magnetic field in the direction of the electromagnetic energy propagation. In Hybrid modes, the electromagnetic energy has some of both electric field and magnetic field the direction of the electromagnetic energy propagation.

TE, TM, and TEM modes can be further specified using two suffix numbers that correspond to two directions orthogonal to the direction of propagation, such as a width direction and a height direction. A non-zero suffix number indicates the respective number of half-wavelengths of the electromagnetic energy equal to the width and height of the waveguide. However, a suffix number of zero indicates that there is no variation of the field with respect to that direction. For example, a $TE_{10}$ mode indicates the waveguide is half-wavelength in width and there is no field variation in the height direction. Typically, when the suffix number is equal to zero, the dimension of the waveguide in the respective direction is less than one-half of a wavelength. In another example, a $TE_{21}$ mode indicates the waveguide is one wavelength in width (i.e. two half wavelengths) and one half wavelength in height.

When operating a waveguide in a TE mode, the suffix numbers also indicate the number of field-maximums along the respective direction of the waveguide. For example, a $TE_{10}$ mode indicates that the waveguide has one electric field maximum in the width direction and zero maxima in the height direction. In another example, a $TE_{21}$ mode indicates that the waveguide has two electric field maxima in the width direction and one maximum in the height direction.

Example systems within the scope of the present disclosure will now be described in greater detail. An example system with which the radar antenna array with parasitic elements excited by surface waves may be used may be implemented in or may take the form of an automobile, a system to test radar capabilities of an automobile having radar, and any type of waveguide system. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other objects that use waveguides are possible to use with the radar antenna array with parasitic elements excited by surface waves as well.

FIG. 1A illustrates an assembled view of the top of an example antenna 100, in accordance with an example embodiment. The example antenna 100 may include the first metal layer 110 and the second metal layer 120. The second metal layer 120 may include a plurality of holes 112 (through-holes and/or blind-holes) configured to house alignment pins, screws, and the like. The first metal layer 110 may include a plurality of holes as well (not shown) that are aligned with the holes 112 of the second metal layer 120. The two metal layers may join at a common plane (i.e. the two metal layers may be joined at a seam).

As shown in FIG. 1A, an array 106 may include an array of DOEWG radiating elements 102 and a plurality of parasitic elements 104, the number and position which may vary based on the number of DOEWGs and channels of the antenna 100. The radiating elements 102 of the DOEWG array may be a linear array (as shown), a two-dimensional array, a single element, or other configuration of radiating elements. The parasitic elements 104 of antenna 100 are shown as radiating slots. The radiating slot may be features of the antenna block that are machined into the top surface of the block. Each slot may have a depth that is less than the thickness of the top layer 120. In various embodiments, the length, depth, position, and spacing of the various slots of the parasitic elements 104 may be adjusted. The length, depth, position, and spacing of the various slots may control how the slots couple and radiate the surface waves. In some examples, the parasitic elements 104 may be created through computer numerical control (CNC) machining of the surface. Additionally, in some examples the parasitic elements 104 may be partially or fully filled with a dielectric material. Further, in some examples the parasitic elements 104 may have an adjustable height. The adjustable height may enable the the parasitic elements 104 to have a reconfigurable pattern. For example, the height may be adjusted so the height is zero, effectively removing one or more of the parasitic elements 104. The parasitic elements 104 may be created in other ways as well.

In some examples, the antenna 100 may include a transmission array 106 and a reception array 108. Although the present parasitic components will generally be described with respect to the transmission array 106, they may be similarly placed near the reception array 108. By placing the parasitic components near the reception array 108, the receive characteristics of the reception array 108 may be improved as well. Further, in such an example embodiment, these dimensions, in addition to or alternative to other dimensions of the example antenna 100, may be machined with no less than about a 0.51 mm error, though in other embodiments, more or less of an error may be required. Other dimensions of the DOEWG array are possible as well.

In some embodiments, the first and second metal layers 110, 120 may be machined from aluminum plates (e.g., about 6.35 mm stock). In such embodiments, the first metal layer 110 may be at least 3 mm in thickness (e.g., about 5.84 mm to 6.86 mm). Further, the second metal layer 120 may be machined from a 6.35 mm stock to a thickness of about 3.886 mm. Other thicknesses are possible as well.

In some embodiments, the joining of the two metal layers 110, 120 may result in an air gap or other discontinuity between mating surfaces of the two layers. In such embodiments, this gap or discontinuity may be proximate to (e.g. as close as possible to) a center of the length of the antenna apparatus and may have a size of about 0.05 mm or smaller.

FIG. 1B illustrates an assembled views of the top of an example antenna 150, in accordance with an example embodiment. The example antenna 150 may be similar to antenna 100 of FIG. 1A. However, the transmission array 106 of antenna 150 may include parasitic elements 154 that are raised elements. Similar to parasitic elements 104 of FIG. 1A, the parasitic elements 154 of FIG. 1B couple and radiate at least some of the surface waves that are transmitted by the antenna elements. The parasitic elements 154 are shown as raised elements in FIG. 1B. The parasitic elements 154 may be coupled to the top surface of the layer 120. In some examples, the parasitic elements 154 may be machined separately and later attached to the top surface of the layer 120. In some examples the parasitic elements 154 may be made from metal. In other examples, the parasitic elements 154 may be made from a dielectric. In some further examples, the parasitic elements 154 may be created in a separate layer than covers a portion or all of the top surface of the layer 120. In some further examples, an antenna may have both slots like parasitic elements 104 and raised elements like parasitic elements 154.

Figure 1C:
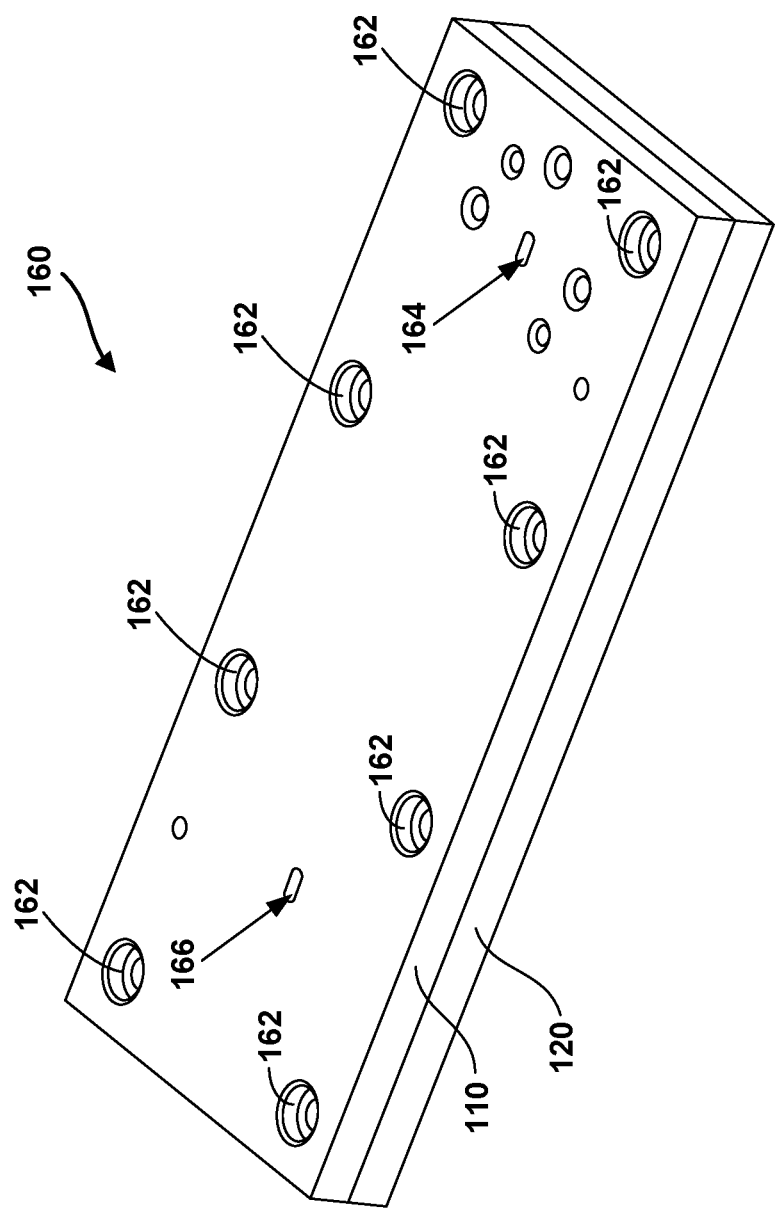
FIG. 1C illustrates an assembled view of the bottom of an example antenna, in accordance with an example embodiment

FIG. 1C illustrates an assembled view of the bottom of an example antenna 160, in accordance with an example embodiment. The antenna 160 may be the bottom of either antenna 100 or antenna 150. In some examples, antenna 160 may be the bottom of an antenna other than antenna 100 or antenna 150. As shown, the first metal layer 110 may include a plurality of holes 162 (through-holes and/or blind-holes) configured to house alignment pins, screws, and the like. One or more of the plurality of holes 162 may be aligned with the holes of the second metal layer 120. Further, FIG. 1C shows two ports 164, 166 in the first metal layer 110. The ports 164, 166 may be where the antenna 160 receives electromagnetic waves into the one or more waveguide channels located within the antenna 160. The ports 164, 166 may also be where the antenna 160 couples electromagnetic waves from the one or more waveguide channels located within the antenna 160 to subsequent processing. In some examples the ports 164, 166 may be bidirectional, configured to couple signals into and out of the antenna 160.

Figure 2A:
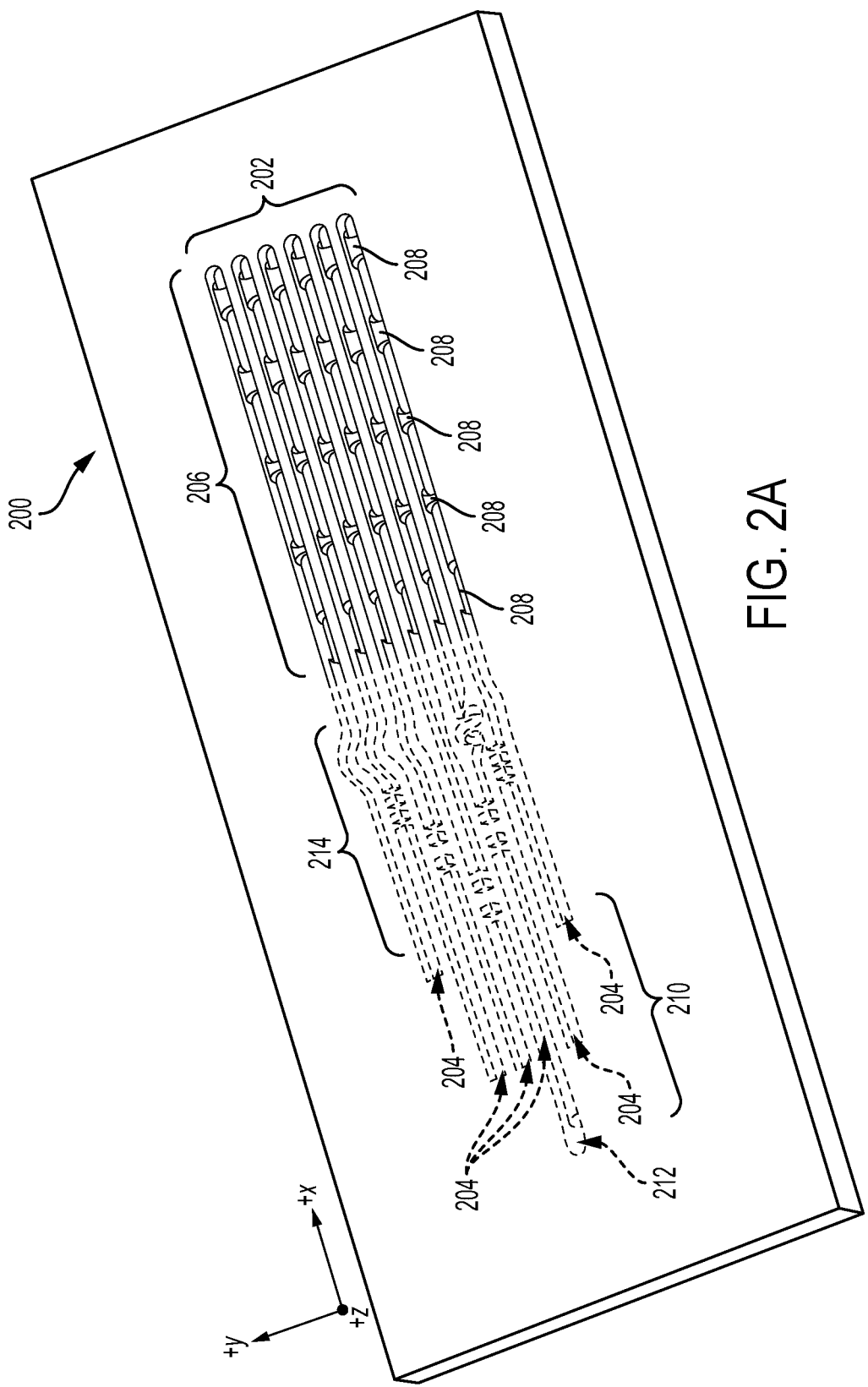
FIG. 2A illustrates a first layer of an example antenna, in accordance with an example embodiment
Figure 2B:
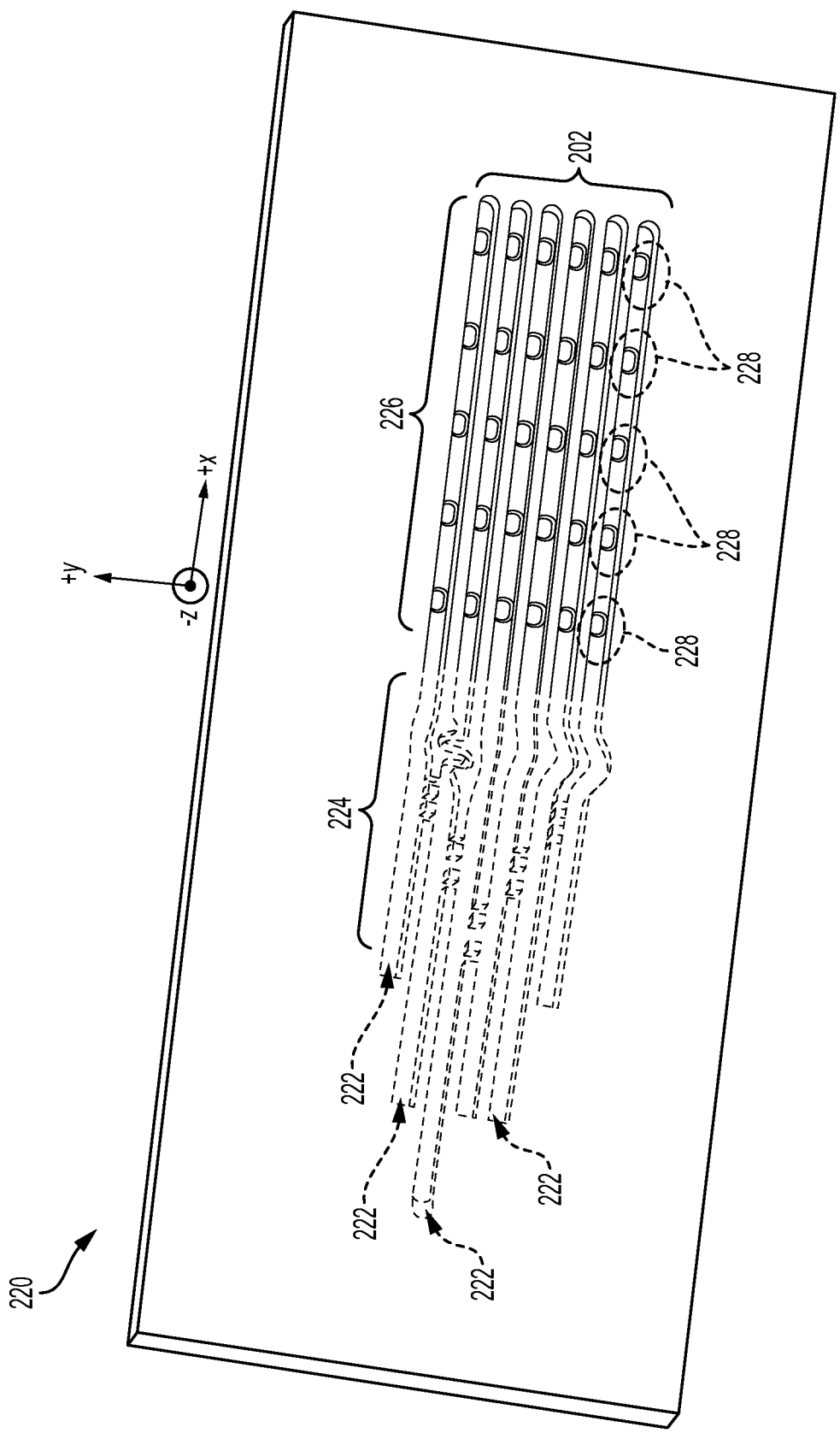
FIG. 2B illustrates a second layer of an example antenna, in accordance with an example embodiment

FIG. 2A illustrates a first layer 200 of an example antenna, in accordance with an example embodiment. The dashed lines of the waveguide (used throughout) indicate the beam-forming components of the feed waveguides. As previously discussed, the presently disclosed parasitic elements (not shown in FIG. 2A) may reduce the complexity of an antenna system by removing or reducing the need for complex beamforming structures. However, the parasitic elements may be used in system containing these complex beamforming structures. The example antenna of FIGS. 2A and 2B are example antennas that show the beamforming network. In this example, first metal layer 200 includes a first half of a plurality of waveguide channels 202. These waveguide channels 202 may comprise multiple elongated segments 204. At a first end 206 of each elongated segment 204 may be a plurality of collinear wave-directing members 208, each with sizes similar or different from other wave-directing members. In line with the description above, the first ends 206 of the elongated segments 204 may be referred to herein as a first half of wave-radiating channels.

At a second end 210 of the channels 202 opposite the first end 206, one of the elongated segments 204 may include a through-hole 212 (i.e., input port). A given amount of power may be used to feed a corresponding amount of electromagnetic waves (i.e., energy) into the apparatus, and the through-hole 212 may be the location where these waves are fed into the apparatus. In line with the description above, the single channel/segment of the waveguide channels 202 that includes the input port may be referred to herein as an input waveguide channel.

Upon entering the apparatus, the electromagnetic waves may generally travel in the +x direction, as shown, towards an array of power dividers 214 (i.e., a "beam-forming network"). The array 214 may function to divide up the electromagnetic waves and propagate respective portions of the waves to respective first ends 206 of each elongated segment 204. More specifically, the waves may continue to propagate in the +x direction after leaving the array 214 toward the wave-directing members 208. In line with the description above, the array 214 section of the waveguide channels may be referred to herein as wave-dividing channels.

As the portions of the electromagnetic waves reach the wave-directing members 208 at the first end 206 of each elongated segment 204 of the waveguide channels 202, the wave-directing members 208 may propagate through respective sub-portions of the electromagnetic energy to a second half of the waveguide channels (i.e., in the +z direction, as shown). For instance, the electromagnetic energy may first reach a wave-directing member that is recessed, or machined further into the first metal layer 200 (i.e., a pocket). That recessed member may be configured to propagate a smaller fraction of the electromagnetic energy than each of the subsequent members further down the first end 206, which may be protruding members rather than recessed members. Further, each subsequent member may be configured to propagate a greater fraction of the electromagnetic waves travelling down that particular elongated segment 204 at the first end 206 than the member that came before it. As such, the member at the far end of the first end 206 may be configured to propagate the highest fraction of electromagnetic waves. Each wave-directing member 208 may take various shapes with various dimensions. In other examples, more than one member (or none of the members) may be recessed. Still other examples are possible as well. In addition, varying quantities of elongated segments are possible.

A second metal layer may contain a second half of the one or more waveguide channels, where respective portions of the second half of the one or more waveguide channels include an elongated segment substantially aligned with the elongated segment of the first half of the one or more waveguide channels and, at an end of the elongated segment, at least one pair of through-holes partially aligned with the at least one wave-directing member and configured to radiate electromagnetic waves propagated from the at least one wave-directing member out of the second metal layer.

Within examples, the elongated segment of the second half may be considered to substantially align with the elongated segment of the first half when the two segments are within a threshold distance, or when centers of the segments are within a threshold distance. For instance, if the centers of the two segments are within about ±0.051 mm of each other, the segment may be considered to be substantially aligned.

In another example, when the two halves are combined (i.e., when the two metal layers are joined together), edges of the segments may be considered to be substantially aligned if an edge of the first half of a segment and a corresponding edge of the second half of the segment are within about ±0.051 mm of each other.

In still other examples, when joining the two metal layers, one layer may be angled with respect to the other layer such that their sides are not flush with one another. In such other examples, the two metal layers, and thus the two halves of the segments, may be considered to be substantially aligned when this angle offset is less than about 0.5 degrees.

In some embodiments, the at least one pair of through-holes may be perpendicular to the elongated segments of the second half of the one or more waveguide channels. Further, respective pairs of the at least one pair of through-holes may include a first portion and a second portion. As such, a given pair of through-holes may meet at the first portion to form a single channel. That single channel may be configured to receive at least the portion of electromagnetic waves that was propagated by a corresponding wave-directing member and propagate at least a portion of electromagnetic waves to the second portion. Still further, the second portion may include two output ports configured as a doublet and may be configured to receive at least the portion of electromagnetic waves from the first portion of the pair of through-holes and propagate at least that portion of electromagnetic waves out of the two output ports.

FIG. 2B illustrates a second layer 220 of an example antenna, in accordance with an example embodiment. The second metal layer 220 may include a second half of the plurality of waveguide channels 202 of the first metal layer 200 shown in FIG. 2A (i.e., a second half of the input waveguide channel, the wave-dividing channels, and the wave-radiating channels). As shown, the second half of the waveguide channels 202 may take on the general form of the first half of the channels, so as to facilitate proper alignment of the two halves of the channels. The elongated segments of the second half 222 may include second halves of the array of power dividers 224. As described above, electromagnetic waves may travel through the array 224, where they are divided into portions, and the portions then travel (i.e., in the +x direction, as shown) to respective ends 226 of the second halves of the elongated segments 222. Further, an end 226 of a given elongated segment may include multiple pairs of through-holes 228, which may be at least partially aligned with the wave-directing members 208 of the first metal layer 200. More specifically, each pair of through-holes may be at least partially aligned with a corresponding wave-directing member, also referred to as a reflecting element, such that when a given sub-portion of electromagnetic waves are propagated from the first metal layer 200 to the second metal layer 220, as described above, those sub-portions are then radiated out of the pair of through-holes (i.e., a pair of output ports) in the −z direction, as shown. Again, the combination of a given wave-directing member and a corresponding pair of output ports may form a DOEWG, as described above.

Moreover, a combination of all the DOEWGs may be referred to herein as a DOEWG array. In antenna theory, when an antenna has a larger radiating aperture (i.e., how much surface area of the antenna radiates, where the surface area includes the DOEWG array) that antenna may have higher gain (dB) and a narrower beam width. As such, in some embodiments, a higher-gain antenna may include more channels (i.e., elongated segments), with more DOEWGs per channel. While the example antenna illustrated in FIGS. 2A and 2B may be suitable for autonomous-vehicle purposes (e.g., six elongated segments, with five DOEWGs per segment), other embodiments may be possible as well, and such other embodiments may be designed/machined for various applications, including, but not limited to, automotive radar.

For instance, in such other embodiments, an antenna may include a minimum of a single DOEWG. With this arrangement, the output ports may radiate energy in all directions (i.e. low gain, wide beamwidth). Generally, an upper limit of segments/DOEWGs may be determined by a type of metal used for the first and second metal layers. For example, metal that has a high resistance may attenuate an electromagnetic wave as that wave travels down a waveguide channel. As such, when a larger, highly-resistive antenna is designed (e.g., more channels, more segments, more DOEWGs, etc.), energy that is injected into the antenna via the input port may be attenuated to an extent where not much energy is radiated out of the antenna. Therefore, in order to design a larger antenna, less resistive (and more conductive) metals may be used for the first and second metal layers. For instance, in embodiments described herein, at least one of the first and second metal layers may be aluminum. Further, in other embodiments, at least one of the first and second metal layers may be copper, silver, or another conductive material. Further, aluminum metal layers may be plated with copper, silver, or other low-resistance/high-conductivity materials to increase antenna performance. Other examples are possible as well.

The antenna may include at least one fastener configured to join the first metal layer to the second metal layer so as to align the first half of the one or more waveguide channels with the second half of the one or more waveguide channels to form the one or more waveguide channels (i.e., align the first half of the plurality of wave-dividing channels with the second half of the plurality of wave-dividing channels, and align the first half of the plurality of wave-radiating channels with the second half of the plurality of wave-radiating channels). To facilitate this in some embodiments, the first metal layer, a first plurality of through-holes (not shown in FIG. 2A) may be configured to house the at least one fastener. Additionally, in the second metal layer, a second plurality of through-holes (not shown in FIG. 2B) may be substantially aligned with the first plurality of through-holes and configured to house the at least one fastener for joining the second metal layer to the first metal layer. In such embodiments, the at least one fastener may be provided into the aligned first and second pluralities of through-holes and secured in a manner such that the two metal layers are joined together.

In some examples, the at least one fastener may be multiple fasteners. Mechanical fasteners (and technology used to facilitate fastening) such as screws and alignment pins may be used to join (e.g., screw) the two metal layers together. Further, in some examples, the two metal layers may be joined directly to each other, with no adhesive layer in between. Still further, the two metal layers may be joined together using methods different than adhesion, such as diffusion bonding, soldering, brazing, and the like. However, it is possible that, in other examples, such methods may be used in addition to or alternative to any methods for joining metal layers that are known or not yet known.

In some embodiments, one or more blind-holes may be formed into the first metal layer and/or into the second metal layer in addition to or alternative to the plurality of through-holes of the first and/or the second metal layer. In such embodiments, the one or more blind-holes may be used for fastening (e.g., housing screws or alignment pins) or may be used for other purposes.

Figure 2C:
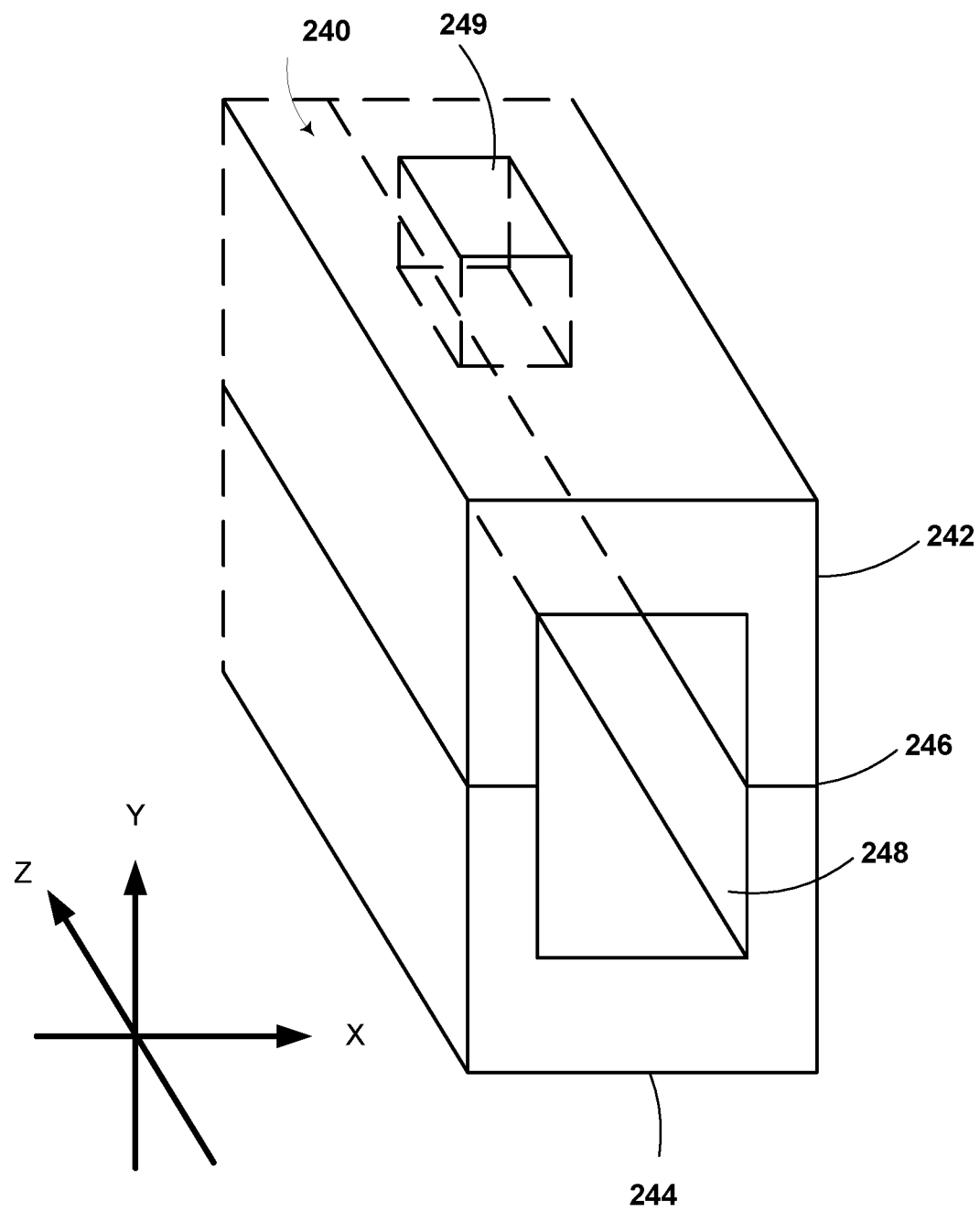
FIG. 2C illustrates an example isometric cross-section view of a waveguide

FIG. 2C illustrates an example isometric cross-section view of a waveguide 240. The example waveguide 240 is formed with a top portion 242 and a bottom portion 244. The top portion 242 and a bottom portion 244 are coupled at seam 246. The waveguide includes a cavity 248. Within cavity 248, electromagnetic energy propagates during the operation of waveguide 240. The waveguide 240 may also include a feed 249. Feed 249 can be used to provide electromagnetic energy to cavity 248 in waveguide 240. Alternatively or additionally, feed 249 may be used to allow electromagnetic energy to leave waveguide 240. The example waveguide 240 of FIG. 2C features seam 246 at the middle point of the height of cavity 248. In various embodiments, the top portion 242 and a bottom portion 244 may be coupled together at various different positions along an axis of the waveguide.

Figure 3:
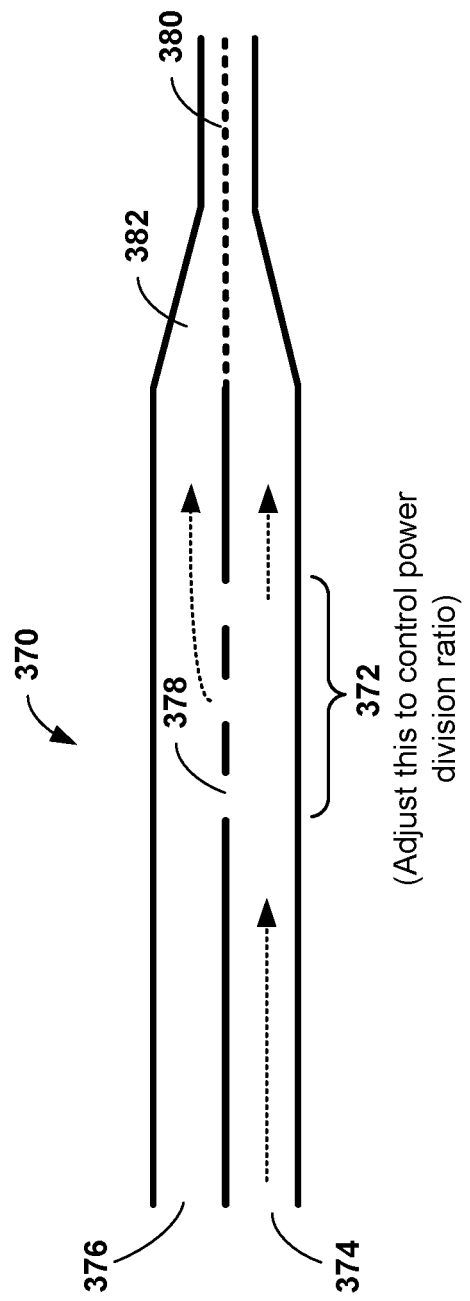
FIG. 3 illustrates an example power coupler, in accordance with an example embodiment

FIG. 3 illustrates an example power coupler, in accordance with an example embodiment. The power coupler may function to divide electromagnetic energy (i.e. power) that is in the waveguides. A power coupler is formed between two sections of waveguides that are aligned vertically adjacent or horizontally adjacent to each other. Because the power coupler forms a portion of the beam-forming network, as previously discussed, there are examples where the power coupler may not be needed as the parasitic elements can simplify the antenna's design.

Energy may enter the antenna through an input waveguide channel and is divided (i.e., split) into smaller portions of energy at each power divider, such as power divider 370, and may be divided multiple times via subsequent power dividers so that a respective amount of energy is fed into each of the feed waveguides. The amount of energy that is divided at a given power divider may be controlled by a power division ratio (i.e., how much energy goes into one channel 374 versus how much energy goes into another channel 376 after the division). A given power division ratio may be adjusted based on the dimensions of the corresponding power divider. Further, each power divider and associated power division ratio may be designed/calculated in order to achieve a desired "power taper" at the wave-radiating channels.

Within examples, (such as that shown in FIG. 3) a technique for dividing energy between two adjacent waveguides 374, 376 may be to use a metal layer with a coupling aperture 372 such as that shown in FIG. 3. By adjusting the size, shape, and location of the coupling aperture 372, a desired taper profile may be achieved. Further, two adjacent waveguides, each located in a different split block section may couple to ramp section 382 to form a single waveguide. The single waveguide after the ramp section may be located in the common plane of the split-block assembly 380.

Figure 4:
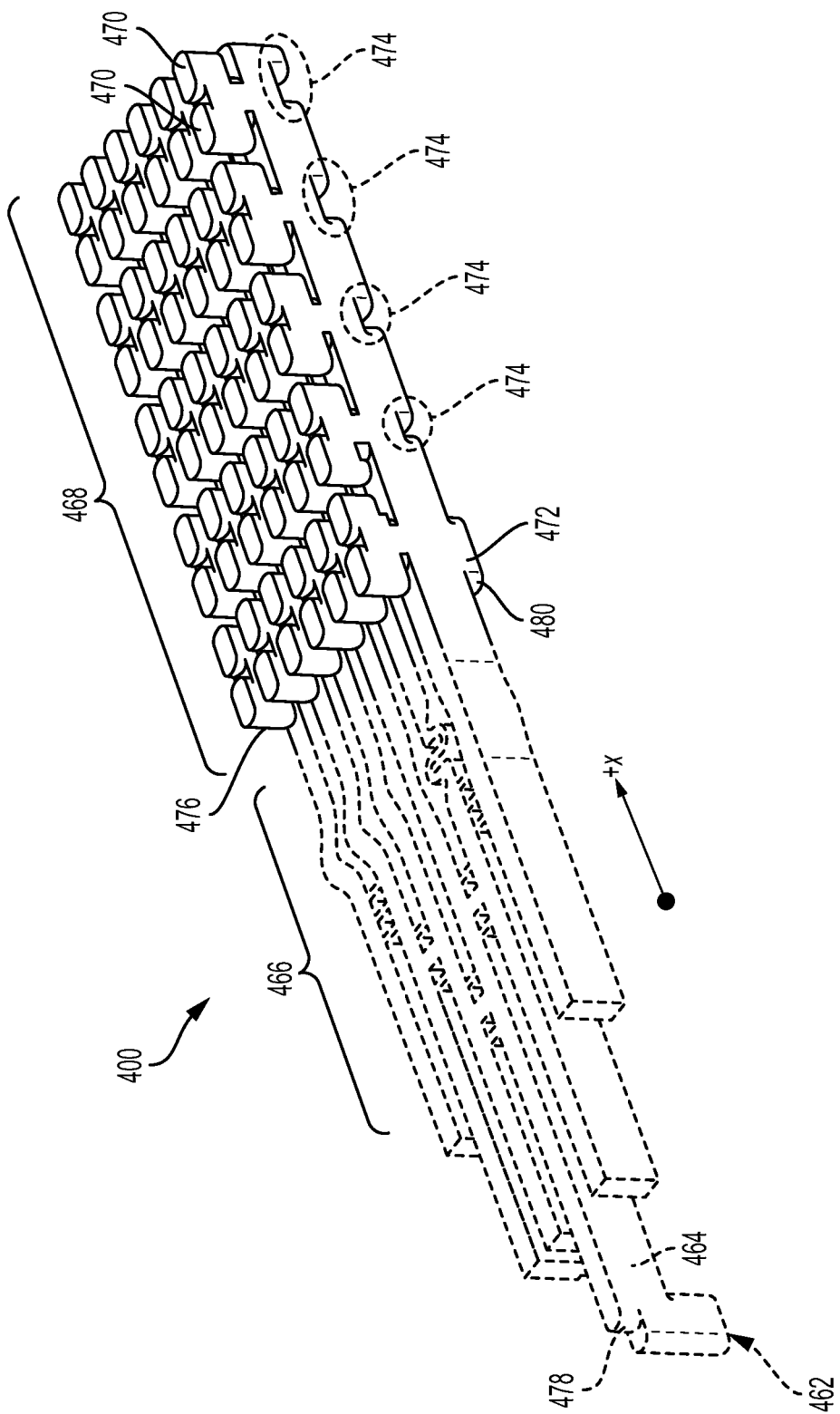
FIG. 4 illustrates conceptual waveguide channels formed inside an assembled example antenna, in accordance with an example embodiment

FIG. 4 illustrates conceptual waveguide channels 400 formed inside an assembled example antenna. More particularly, the waveguide channels 400 take the form of the waveguide channels 202 of FIGS. 2A and 2B. For instance, the channels 400 include an input port 462 to the input waveguide channel 464. The channels 400 also include wave-dividing channels 466 and a plurality of radiating doublets 468 (i.e., a DOEWG array). As described above, when electromagnetic waves enter the channels 400 at the input port 462, they may travel in the +x direction through the input waveguide channel 464 and be divided into portions by the wave-dividing channels 466 (e.g., by the power dividers). Those portions of electromagnetic waves may then travel in the +x direction to respective radiating doublets 468, where sub-portions of those portions are radiated out each DOEWG through pairs of output ports, such as radiating pair 470, for instance.

In a particular wave-radiating channel, a portion of electromagnetic waves may first be propagated through a first DOEWG with a recessed wave-directing member 472 (i.e., an inverse step, or "well"), as discussed above. This recessed wave-directing member 472 may be configured to radiate the smallest fraction of energy of all the members of the DOEWGs of the particular wave-radiating channel. In some examples, subsequent wave-directing members 474 may be formed (e.g., protruded, rather than recessed) such that each subsequent DOEWG can radiate a higher fraction of the remaining energy than the DOEWG that came before it. Phrased another way, each wave-directing member 472, 474 may generally be formed as a "step cut" into a horizontal (+x direction) channel (i.e., a wave-radiating channel, or the "first end" of an "elongated segment" as noted above) and used by the antenna to tune the amount of energy that is radiated vs. the amount of energy that is transmitted further down the antenna.

In some embodiments, a given DOEWG may not be able to radiate more than a threshold level of energy and may not be able to radiate less than a threshold level of energy. These thresholds may vary based on the dimensions of the DOEWG components (e.g., the wave-directing member, a horizontal channel, a vertical channel, a bridge between the two output ports, etc.), or may vary based on other factors associated with the antenna. In some embodiments, the first and second metal layers may be machined such that various sides of the waveguide channels 400 have rounded edges, such as edge 476, 478, and 480, for example.

Figure 5:
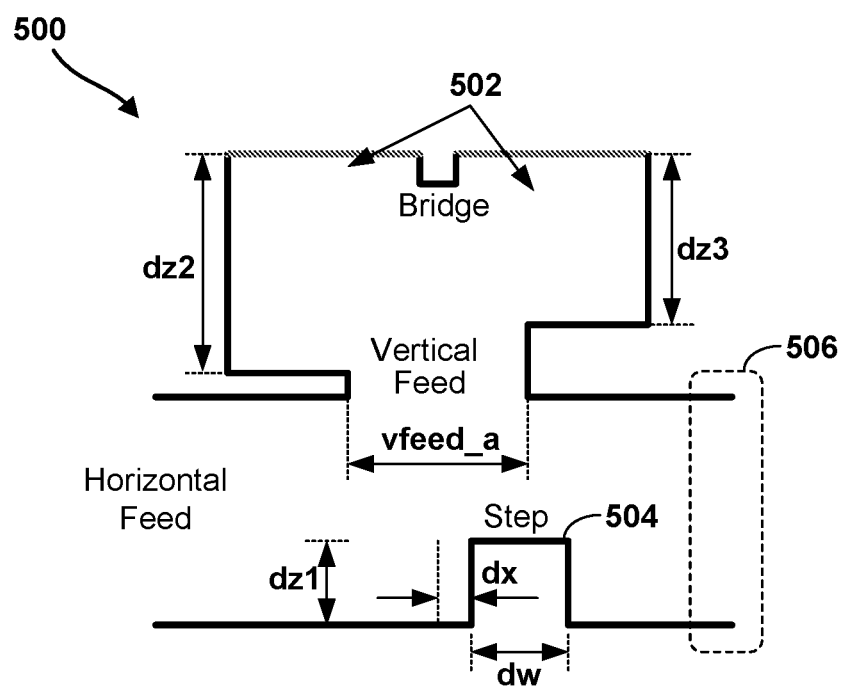
FIG. 5 illustrates an example wave-radiating portion of an example antenna, in accordance with an example embodiment
Figure 6:
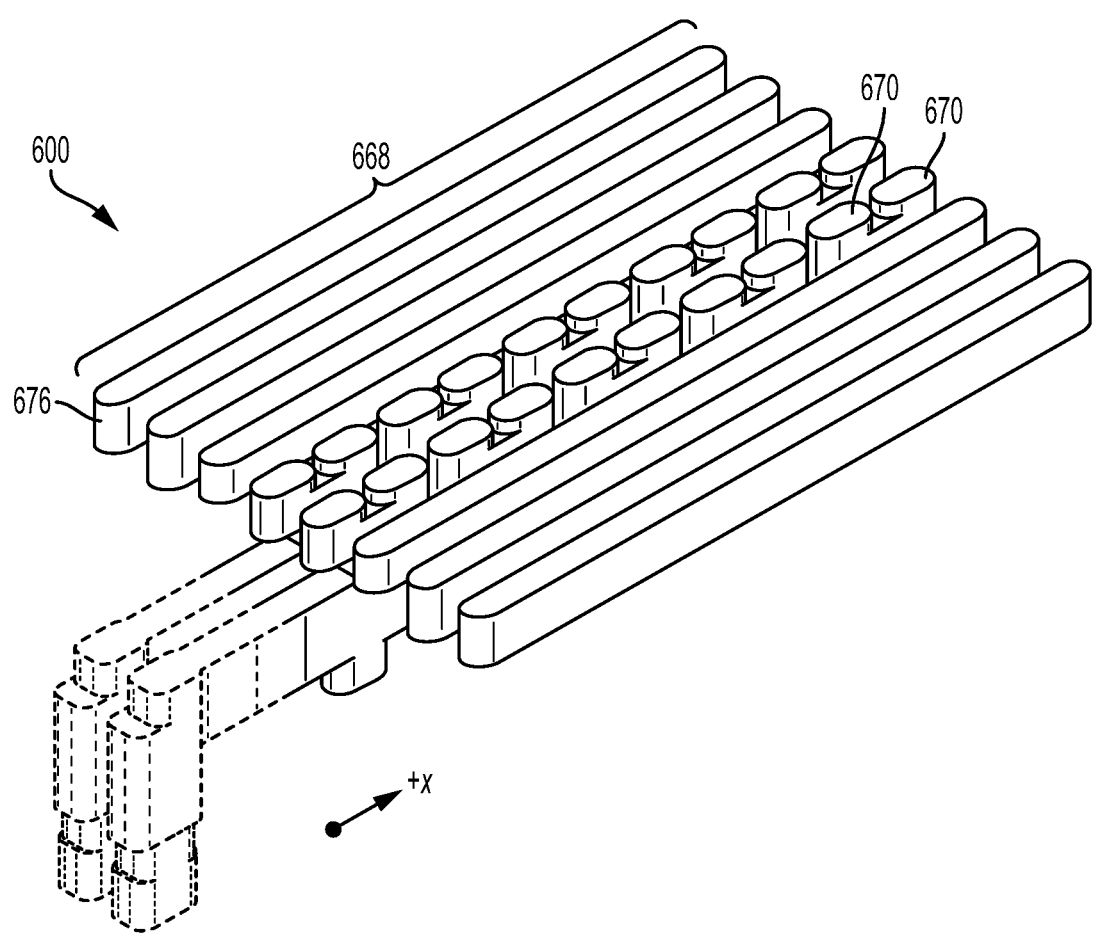
FIG. 6 illustrates conceptual waveguide channels formed inside an assembled example antenna, in accordance with an example embodiment

FIG. 5 illustrates an example wave-radiating portion 500 of an example antenna, in accordance with an example embodiment. The wave-radiating portion 500 of FIG. 5 illustrates an example wave-radiating doublet of an example antenna, in accordance with an example embodiment. More specifically, FIG. 5 illustrates a cross-section of an example DOEWG 500. As noted above, a DOEWG 500 may include a horizontal feed (i.e., channel), a vertical feed (i.e. a doublet neck), and a wave-directing member 504. The vertical feed may be configured to couple energy from the horizontal feed to two output ports 502, each of which is configured to radiate at least a portion of electromagnetic waves out of the DOEWG 500. In some embodiments, the farthest DOEWG from the input port may include a backstop at location 506. The backstop may be an end or a termination of the respective waveguide. DOEWGs that come before the last DOEWG may simply be open at location 506 and electromagnetic waves may propagate through that location 506 to subsequent DOEWGs. For example, a plurality of DOEWGs may be connected in series where the horizontal feed is common across the plurality of DOEWGs (as shown in FIG. 6). FIG. 5 shows various parameters that may be adjusted to tune the amplitude and/or phase of an electromagnetic signal that couples into the radiating element.

In order to tune a DOEWG such as DOEWG 500, the vertical feed width, vfeed_a, and various dimensions of the step 504 (e.g., dw, dx, and dz1) may be tuned to achieve different fractions of radiated energy out the DOEWG 500. The step 504 may also be referred to as a reflecting component as it reflects a portion of the electromagnetic waves that propagate down the horizontal feed into the vertical feed. Further, in some examples, the height dz1 of the reflecting component may be negative, that is may extend below the bottom of the horizontal feed. Similar tuning mechanisms may be used to tune the parasitic components as well. For example, the parasitic components may include any of the vertical width, and various dimensions of the height (e.g., dw, dx, and dz1).

In some examples, each output port 502 of the DOEWG 500 may have an associated phase and amplitude. In order to achieve the desired phase and amplitude for each output port 502, various geometry components may be adjusted. As previously discussed, the step (reflecting component) 504 may direct a portion of the electromagnetic wave through the vertical feed. In order to adjust an amplitude associated with each output port 502 of a respective DOEWG 500, a height associated with each output port 502 may be adjusted. Further, the height associated with each output port 502 could be the height or the the depths of this feed section of output port 502, and not only could be a height or depth adjustment but it could be a multiplicity of these changes or steps or ascending or descending heights or depths in general.

As shown in FIG. 5, height dz2 and height dz3 may be adjusted to control the amplitude with respect to the two output ports 502. The adjustments to height dz2 and height dz3 may alter the physical dimensions of the doublet neck (e.g. vertical feed of FIG. 5). The doublet neck may have dimensions based on the height dz2 and height dz3. Thus, as the height dz2 and height dz3 are altered for various doublets, the dimensions of the doublet neck (i.e. the height of at least one side of the doublet neck) may change. In one example, because height dz2 is greater than height dz3, the output port 502 associated with (i.e. located adjacent to) height dz2 may radiate with a greater amplitude than the amplitude of the signal radiated by the output port 502 associated with height dz3.

The above-mentioned adjustments to the geometry may also be used to adjust a geometry of the parasitic elements where it on the top surface of the antenna unit. For example, heights and widths may be adjusted or added to the parasitic elements in order to adjust the radiation properties of the system. An impedance match, phase control, and/or amplitude control may be implemented by adjusting the geometry of the parasitic elements.

FIG. 6 illustrates conceptual waveguide channels formed inside an assembled example antenna, in accordance with an example embodiment. The various elements of FIG. 6 may be similar to those described with respect to FIG. 4. FIG. 6 includes a set of parasitic elements 668 on the sides of the group of radiating elements, shown as radiating pair 670.

As previously discussed, the group of radiating elements, including radiating pair 670, are configured to radiate an electromagnetic signal fed to them by the waveguides. During the operation of the radiating elements, a surface wave may be launched as well. The set of parasitic elements 668 may be configured to radiate at least a portion of the surface wave.

The set of parasitic elements 668 may be an array or an arrangement of radiating slots, shown by example slot 676. In FIG. 6, the set of parasitic elements 668 are slots that are etched into a top surface of the antenna block. The top of each slot is the top surface of the block. The top of each slot of the set of parasitic elements 668 lies in the same plane as the top of each radiating element, such as radiating pair 670. However, in other examples, some of the parasitic elements 668 may lie in a different plane, such as being mounted on a top surface of the antenna block. In further examples, the parasitic elements 668 may take a form other than radiating slots, such as a patch, a surface-mount component, a dielectric surface, a Fresnel pattern, and/or a different material. In some examples, the parasitic elements 668 may use a combination of various different radiating features. For example, some of the parasitic elements 668 may be radiating slots filled with a dielectric while other slots are air filled.

Figure 7A:
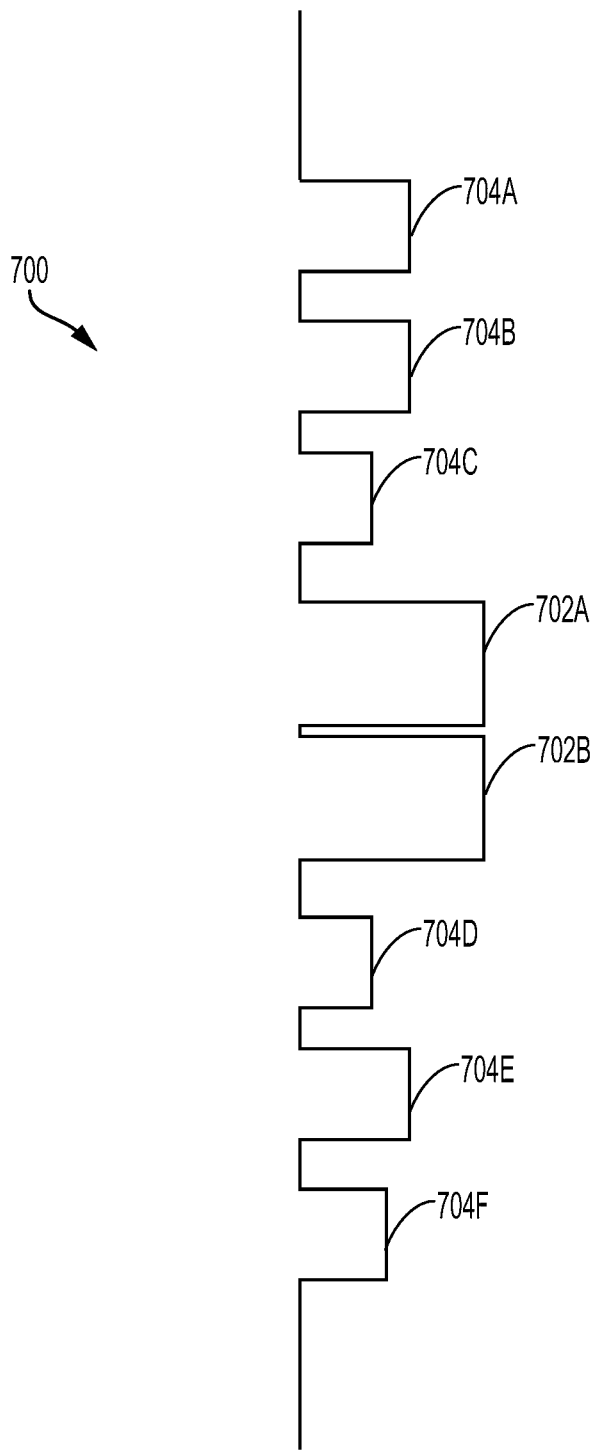
FIG. 7A illustrates a conceptual cross section of an example antenna

FIG. 7A illustrates conceptual cross section of an example antenna 700. The example antenna 700 may include two electromagnetic feeds 702A-B and a plurality of parasitic elements 704A-F. The two electromagnetic feeds 702A-B may be the previously-described radiating elements. In some examples, signals from the two electromagnetic feeds 702A-B may be fed in phase or out of phase. By controlling the phase between the two electromagnetic feeds 702A-B, the angle at which the antenna block radiates signals may be controlled. Controlling the angle at which the antenna block radiates signals may be called beam steering. Additionally, when the two electromagnetic feeds 702A-B cause a signal (i.e. electromagnetic energy) to be radiated, a surface wave may be launched as well. The surface wave may propagate as an electromagnetic current on the surface of the antenna block away from the the two electromagnetic feeds 702A-B.

The plurality of parasitic elements 704A-F may be able to capture and reradiate some or all of the electromagnetic energy that is present in the surface wave. In various embodiments, the various parasitic elements 704A-F may have different depths and positions. Additionally, the parasitic elements 704A-F may take the form of radiating slots, radiating holes, or other different structures.

By adjusting the depth, width, and position of the parasitic elements 704A-F, the radiating properties of the parasitic elements 704A-F may be adjusted. In some examples, the dimensions of the parasitic elements 704A-F may be designed based on a desired beam pattern. For example, the parasitic elements 704A-F may cause the beam width and/or beam direction to be adjusted compared to an antenna block that does not have parasitic elements 704A-F. Additionally, the number of electromagnetic feeds and parasitic elements may be adjusted as well.

Figure 7B:
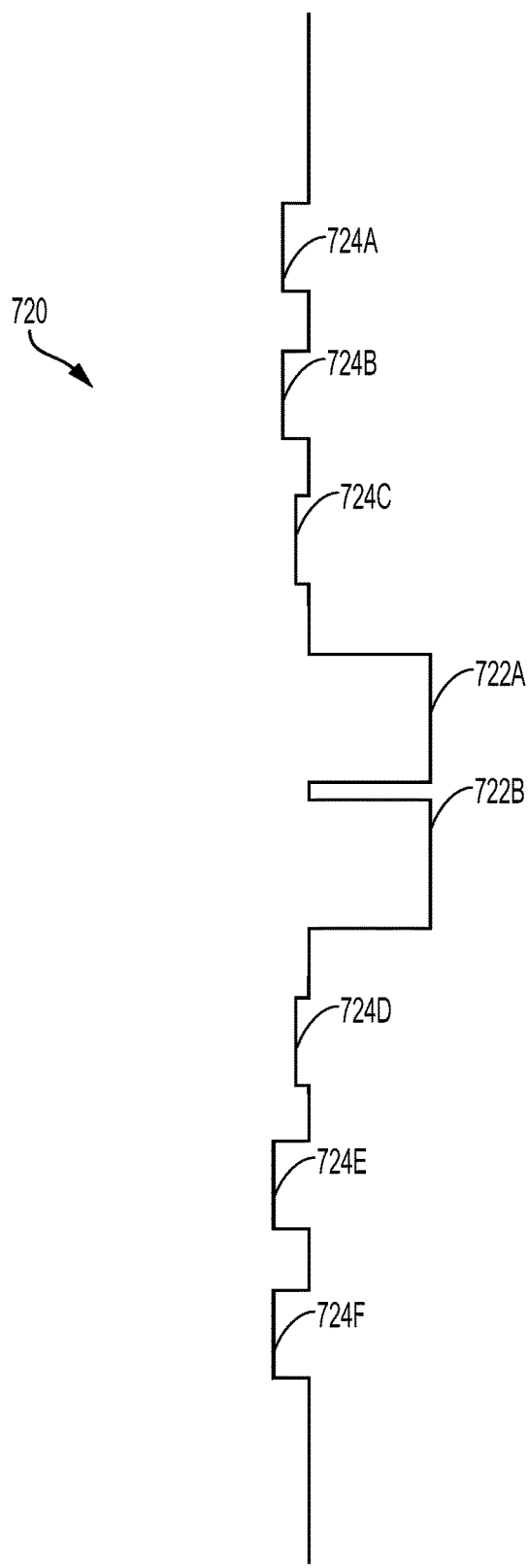
FIG. 7B illustrates a conceptual cross section of an example antenna

FIG. 7B illustrates conceptual cross section of an example antenna 720. The example antenna 720 may be similar to example antenna 700 of FIG. 7A. The example antenna 720 may include two electromagnetic feeds 722A-B and a plurality of parasitic elements 724A-F. Unlike the example antenna 700, the parasitic elements 724A-F of example antenna 720 are raised above the surface of the antenna block of the example antenna 720. As previously discussed, the parasitic elements 724A-F may be metallic or made of a dielectric. The material that parasitic elements 724A-F may be made from depends on the desired radiation properties for the parasitic elements 724A-F. The parasitic elements 724A-F may take the form of raised elements (i.e. inverse slots) or other elements, such as surface mount components or patches.

Figure 7C:
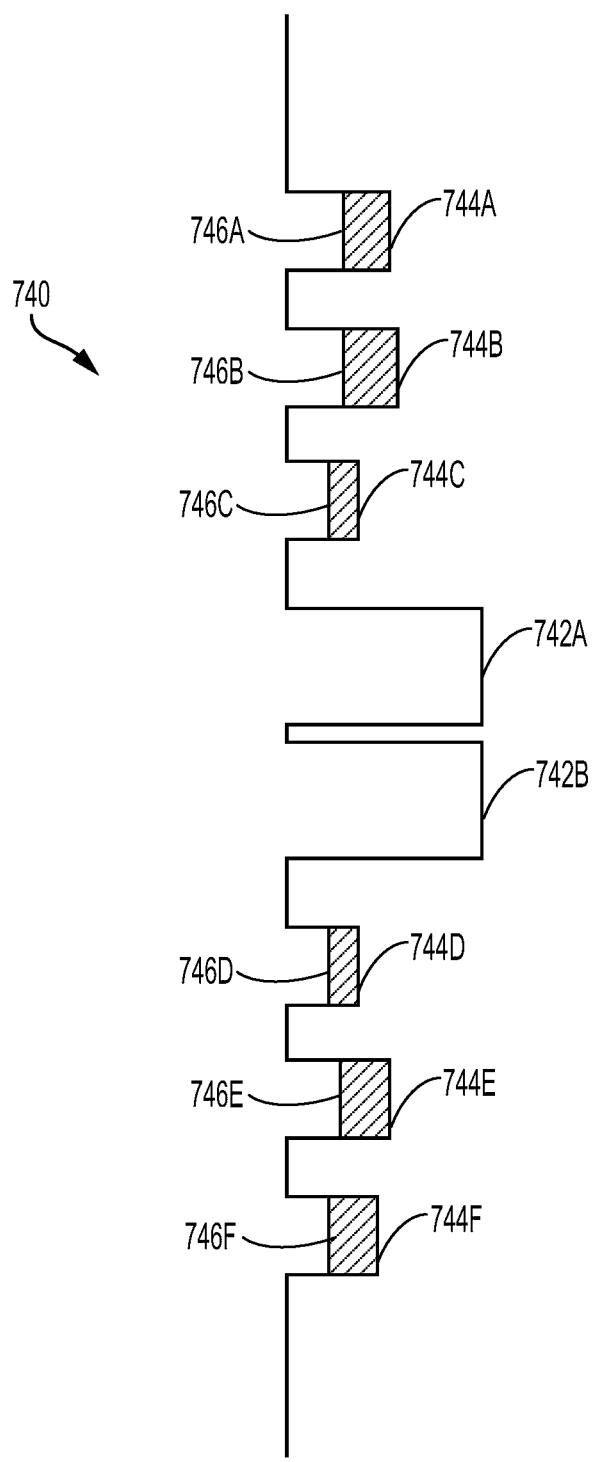
FIG. 7C illustrates a conceptual cross section of an example antenna

FIG. 7C illustrates conceptual cross section of an example antenna 740. The example antenna 740 may be similar to example antenna 700 of FIG. 7A and/or example antenna 720 of FIG. 7B. The example antenna 740 may include two electromagnetic feeds 742A-B and a plurality of parasitic elements 744A-F. Unlike the example antennas 700, 720, the parasitic elements 744A-F of example antenna 740 include adjustable components 746A-F. The adjustable components 746A-F may have a metallic top surface. The adjustable components 746A-F may change thickness based on an applied signal. By adjusting the adjustable components 746A-F, the depth (or height) of the parasitic elements 744A-F may be controlled. In some examples, the parasitic elements 744A-F may be adjusted during the operation of the radar unit. By adjusting the parasitic elements 744A-F, the radiation properties for the antenna unit may be adjusted during the operation of the antenna unit. The adjustments may include controlling a beam width, a beam angle, and/or an efficiency of the antenna unit.

Figure 8:
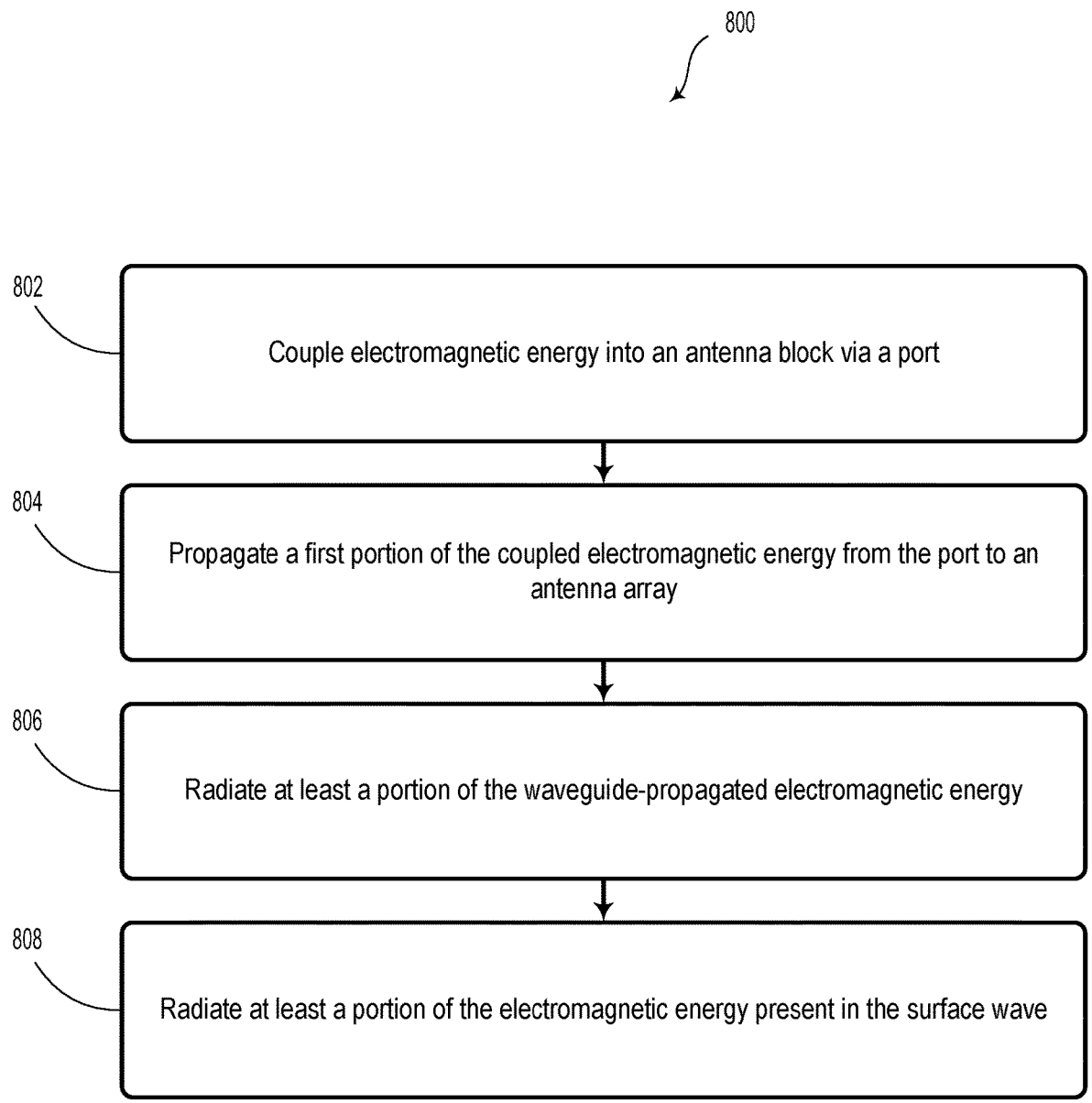
FIG. 8 illustrates a method of operating an example antenna

FIG. 8 illustrates a method 800 of operating an example antenna. The method 800 may begin at block 802 by coupling electromagnetic energy into an antenna block via a port. A port (or plurality of ports) may be located in a bottom surface of an antenna block. The port may be coupled to a circuit board that is configured to propagate electromagnetic signals to and from the antenna block.

At block 804, the method 800 includes propagating at first portion or the coupled electromagnetic energy from the port to an antenna array. The port may be coupled to the antenna array via a network of waveguides. The waveguides may be configured to both propagate the electromagnetic energy from the port to an antenna array as well as splitting the electromagnetic energy to the various antennas of the antenna array. In some examples the network of waveguides may be reactive, that is there are no power absorption components. In other examples, the network of waveguides may also include power absorption components. In various different examples, the network of waveguides may take different forms based on the layout of the various components of the antenna block.

At block 806, the method 800 includes radiating at least of portion of the wave-guide propagated electromagnetic energy. The electromagnetic energy that is propagated to the antenna array may be radiated by the antenna elements that form the antenna array. A portion of the electromagnetic energy will be radiated by the array as a radiating signal into free space. Another portion of the electromagnetic energy will be launched as a surface wave along a top surface of the antenna block. Surface waves are generally undesirable as they may cause the antenna unit to have a lower efficiency. However, if the surface waves may be captured and radiated, the efficiency of the antenna may be increased.

At block 808, the method 800 includes radiating at least a portion of the electromagnetic energy in the surface wave. The surface waves may be captured and reradiated by parasitic elements located on the surface of the antenna block. As previously discussed, the parasitic elements may take many forms, such as radiating slots, a patch, a surface-mount component, a dielectric surface, a Fresnel pattern, and/or a different material. Based on the design of the parasitic elements, the overall radiating properties of the antenna block may be controlled and optimized. For example, the energy in the surface waves may be transmitted in phase with the energy radiated by the array in order to increase the performance of array.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

What is claimed is:

1. An antenna block comprising:
   a port located on an antenna block;
   an antenna located on a top surface of the antenna block;
   a waveguide in the antenna block configured to couple the antenna to the port; and
   at least one parasitic surface wave radiator located on the top surface of the antenna block, wherein the parasitic surface wave radiator is configured to radiate at least a portion of a surface wave propagating along the top surface of the antenna block.

2. The antenna block according to claim 1, wherein the at least one parasitic surface wave radiator comprises a slot.

3. The antenna block according to claim 1, wherein the at least one parasitic surface wave radiator comprises a raised element.

4. The antenna block according to claim 1, wherein the at least one parasitic surface wave radiator comprises a patch.

5. The antenna block according to claim 1, wherein the at least one parasitic surface wave radiator comprises a dielectric radiator.

6. The antenna block according to claim 1, wherein the at least one parasitic surface wave radiator comprises a plurality of parasitic surface wave radiators, wherein the plurality of parasitic surface wave radiators are arranged in an array.

7. The antenna block according to claim 1, wherein the antenna comprises an antenna array.

8. The antenna block according to claim 1, wherein the at least one parasitic surface wave radiator is configured to steer a radiated beam from the antenna block.

9. A method comprising:
   coupling electromagnetic energy into an antenna block via a port located on an antenna block;
   propagating, by a waveguide in the antenna block, a first portion of the coupled electromagnetic energy from the port to an antenna located on a top surface of the antenna block, wherein a second portion of the coupled electromagnetic energy is present in a surface wave on the top surface of the antenna block;

radiating, by the antenna, at least a portion of the waveguide-propagated electromagnetic energy; and radiating, by at least one parasitic surface wave radiator located on the top surface of the antenna block, at least a portion of the electromagnetic energy present in the surface wave.

10. The method according to claim 9, wherein the at least one parasitic surface wave radiator comprises a slot.

11. The method according to claim 9, wherein the at least one parasitic surface wave radiator comprises a raised element.

12. The method according to claim 9, wherein the at least one parasitic surface wave radiator comprises a patch.

13. The method according to claim 9, wherein the at least one parasitic surface wave radiator comprises a dielectric radiator.

14. The method according to claim 9, wherein the at least one parasitic surface wave radiator comprises a plurality of surface wave radiators, wherein the plurality of surface wave radiators is arranged in an array.

15. The method according to claim 9, wherein the antenna comprises an antenna array.

16. The method according to claim 9, wherein the at least one parasitic surface wave radiator is configured to steer a radiated beam from the antenna block.

17. The method according to claim 9, further comprising adjusting a beam transmission angle.

18. A system comprising:
a bottom block;
a top block comprising an antenna on a top surface of the top block;
a port;
a seam at a coupling location of the top block and the bottom block, wherein the seam defines a center of a waveguide configured to couple the port to the antenna; and
at least one parasitic surface wave radiator on the top surface of the top block.

19. The system of claim 18, wherein the at least one parasitic surface wave radiator comprises a set of slots located on two opposite sides of the antenna.

20. The system of claim 19, wherein each slot of the set of slots has at least one of an adjustable depth, a dielectric radiator, and variable slot pattern.

* * * * *